United States Patent
Abe

(10) Patent No.: US 6,502,429 B1
(45) Date of Patent: Jan. 7, 2003

(54) OPTICAL FIBER FABRICATION METHOD

(75) Inventor: Yuji Abe, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 182 days.

(21) Appl. No.: 09/937,774

(22) PCT Filed: Feb. 1, 2001

(86) PCT No.: PCT/JP01/00715

§ 371 (c)(1),
(2), (4) Date: Oct. 1, 2001

(87) PCT Pub. No.: WO01/56940

PCT Pub. Date: Aug. 9, 2001

(30) Foreign Application Priority Data

Feb. 1, 2001 (JP) .......................... 2000-024225

(51) Int. Cl.$^7$ .............................. C03B 37/07
(52) U.S. Cl. ............. 65/382; 65/377; 65/382; 65/435; 65/477
(58) Field of Search ................. 65/378, 382, 377, 65/435, 477

(56) References Cited

U.S. PATENT DOCUMENTS 5,175,785 A * 12/1992 Dabby .................. 65/435
5,676,725 A * 10/1997 Ito et al. .................. 65/382
5,925,163 A * 7/1999 Evans et al. ................ 65/378
6,250,112 B1 * 6/2001 Kerdoncuff ................ 65/382

FOREIGN PATENT DOCUMENTS

| EP | 93100780 | 1/1993 |
| EP | 554714 A1 | 8/1993 |
| JP | 8-217481 | 8/1996 |

* cited by examiner

Primary Examiner—James Derrington
(74) Attorney, Agent, or Firm—McDermott, Will & Emery

(57) ABSTRACT

The present invention relates to an optical fiber fabrication method by which an optical fiber having an objective chromatic dispersion characteristic can be obtained readily. In an optical fiber fabrication method, a cutoff wavelength is measured in an optical fiber with a fixed length obtained by first drawing a part of an optical fiber preform. A target glass diameter for yielding an objective chromatic dispersion characteristic is then determined based on the cutoff wavelength thus measured. Then the rest of the optical fiber preform is drawn so that the glass diameter becomes the target glass diameter thus determined, thereby fabricating the optical fiber.

2 Claims, 5 Drawing Sheets

OPTICAL FIBER FABRICATION METHOD

TECHNICAL FIELD

The present invention relates to an optical fiber fabrication method of fabricating an optical fiber with desired optical characteristics by drawing an optical fiber and, more particularly, to a method suitable for fabrication of a dispersion compensating optical fiber.

BACKGROUND ART

In an optical transmission system for optical communication with signals of multiple wavelengths propagated in an optical fiber transmission line, in order to restrain waveform deterioration of the signals propagating in the optical fiber transmission line, the absolute value of accumulated chromatic dispersion of the optical fiber transmission line is desirably as small as possible at the signal wavelengths (e.g., at 1.55 $\mu$m). However, standard single-mode optical fibers used as optical fiber transmission lines have the zero dispersion wavelength near the wavelength of 1.3 $\mu$m and the chromatic dispersion of about 17 ps/nm/km at the wavelength of 1.55 $\mu$m. With the optical fiber transmission line constructed of only such a single-mode optical fiber, optical communication is thus infeasible at high bit rates because of the deterioration of signal waveform. Then a dispersion compensating optical fiber with negative chromatic dispersion at the wavelength of 1.55 $\mu$m is utilized to compensate for the chromatic dispersion of the singlemode optical fiber, thereby decreasing the absolute value of mean chromatic dispersion at the wavelength of 1.55 $\mu$m.

DISCLOSURE OF THE INVENTION

The inventors investigated the conventional optical fiber transmission lines and discovered the following problem. Namely, in order to decrease the absolute value of mean chromatic dispersion of the entire transmission line composed of the single-mode optical fiber and the dispersion compensating optical fiber, it is necessary to properly design a ratio of lengths of the single-mode optical fiber and the dispersion compensating optical fiber, properly design the chromatic dispersion of the dispersion compensating optical fiber according to the chromatic dispersion characteristic of the single-mode optical fiber, and produce the optical fibers as designed.

However, the chromatic dispersion characteristic of the dispersion compensating optical fiber sensitively varies according to variation in glass size (fiber diameter of the dispersion compensating optical fiber). Processing accuracy of the optical fiber preform was insufficient and measurement accuracy of refractive index profile of the optical fiber preform by a preform analyzer was also insufficient. Accordingly, it was difficult to fabricate the dispersion compensating optical fiber having an objective chromatic dispersion characteristic with high accuracy. The above-stated problem is conspicuous in fabrication of the dispersion compensating optical fiber, but also arises in fabrication of optical fibers of other kinds.

The present invention has been accomplished in order to solve the problem as stated above, and an object of the invention is to provide an optical fiber fabrication method by which an optical fiber with an objective chromatic dispersion characteristic can be obtained readily.

An optical fiber fabrication method according to the present invention is a method of fabricating an optical fiber with a desired optical characteristic by controlling an outside diameter of the resultant optical fiber. In this optical fiber fabrication method, a cutoff wavelength is measured in an optical fiber with a fixed length obtained by first drawing a part of an optical fiber preform, a target glass diameter for yielding an objective chromatic dispersion characteristic is determined based on the cutoff wavelength thus measured, and the rest of the optical fiber preform is drawn while an outside diameter is controlled to the target glass diameter thus determined.

Since the optical fiber fabrication method according to the present invention is arranged to feed the measurement result of the cutoff wavelength in the optical fiber with the fixed length obtained immediately after the start of drawing of the optical fiber preform, back to the control of the outside diameter, the optical fiber with the objective chromatic dispersion characteristic can be obtained readily even if the processing accuracy of the optical fiber preform is poor or even if the measurement accuracy of refractive index profile of the optical fiber preform by the preform analyzer is poor.

An optical fiber fabrication method according to the present invention may also be arranged to control the outside diameter by making use of the measurement result of a mode field diameter in the optical fiber with the fixed length obtained after the start of drawing of the optical fiber preform, instead of the cutoff wavelength. In this case, the optical fiber fabrication method is arranged to determine the target glass diameter for yielding the objective chromatic dispersion characteristic, based on the mode field diameter thus measured, and then to drawn the rest of the optical fiber preform while controlling the outside diameter to the target glass diameter thus determined.

By this optical fiber fabrication method, the optical fiber with the objective chromatic dispersion characteristic can be obtained readily even if the processing accuracy of the optical fiber preform is poor or even if the measurement accuracy of refractive index profile of the optical fiber preform by the preform analyzer is poor.

Each of embodiments of the invention will become fully understood from the detailed description and accompanying drawings which will follow. It is to be considered that these embodiments are presented simply for illustration but do not limit the present invention.

The scope of further application of the present invention will become apparent from the detailed description which will follow. It is, however, noted that the detailed description and specific examples present only preferred embodiments of the invention and thus are provided only for illustration and that various modifications and improvements within the spirit and scope of the invention are obvious to those skilled in the art from the detailed description.

BEST MODE FOR CARRYING OUT INVENTION

Embodiments of the optical fiber fabrication method according to the present invention will be described below with reference to FIGS. 1A to 2B, 3, 4A, 4B, and 5. Throughout the description of the drawings the same elements will be denoted by the same reference symbols and redundant description will be omitted.

Figure 1A:
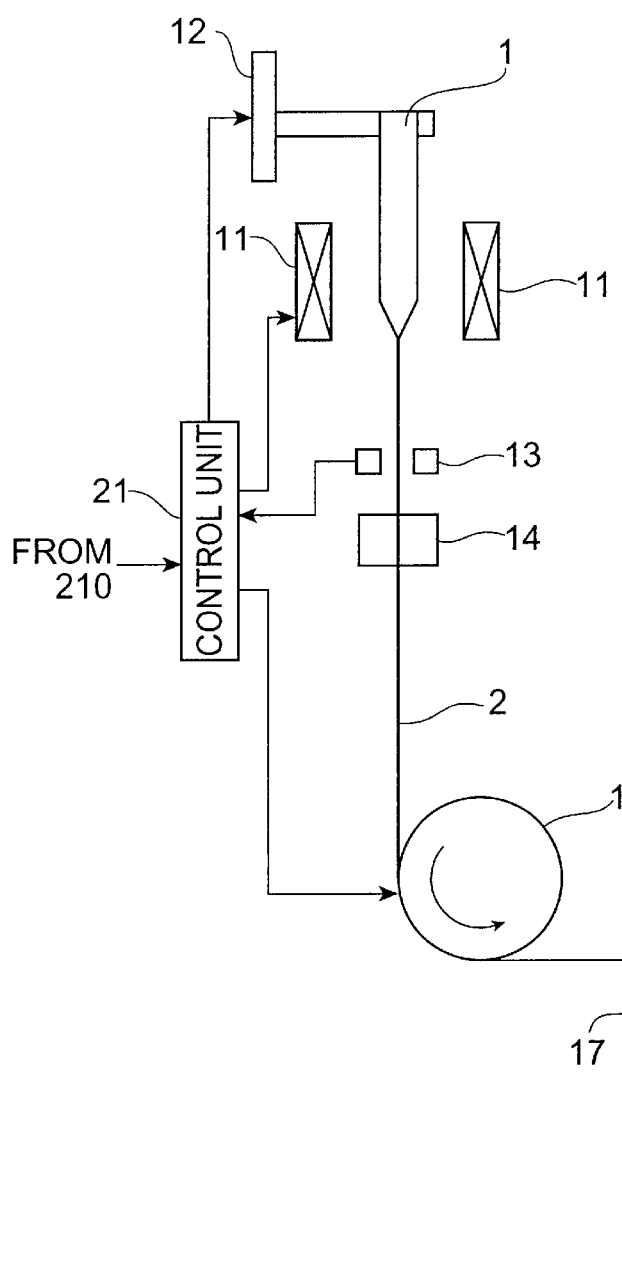
FIG. 1A and FIG. 1B are views showing schematic structure of a drawing system and a measuring system for implementing the optical fiber fabrication method according to the present invention.

First described is a drawing step in the optical fiber fabrication method according to the present invention. FIG. 1A is a view showing the schematic structure of the drawing system for implementing the optical fiber fabrication method according to the present invention. In the drawing system of FIG. 1A, an optical fiber preform 1 is fixed to a preform feeder 12 and is introduced into the interior of heating furnace 11 by the preform feeder 12. Then the heating furnace 11 heats and melts the lower part of the optical fiber preform 1. A bared optical fiber drawn from the lower part of the optical fiber preform 1 thus melted is pulled out of the lower part of the heating furnace 11 to the outside.

The glass diameter d of this bared optical fiber is measured by an outside diameter gauge 13 and the surface of the fiber is coated with a resin by a resin coating unit 14. Namely, the resin coating unit 14 coats the surface of the bared optical fiber with an ultraviolet-curing resin through a primary coating die, and this ultraviolet-curing resin is once cured by irradiation with ultraviolet light. Subsequent thereto, the resin surface of the coating on the bared optical fiber is further coated with the ultraviolet-curing resin through a secondary coating die, and this ultraviolet-curing resin coating is cured by irradiation with ultraviolet light, thereby obtaining a coated optical fiber 2. Then this coated optical fiber 2 is guided via capstan 16 and rollers 17 to 19 in order, to be wound up on a bobbin 20.

The information about the glass diameter d of the bared optical fiber, measured by the outside diameter gauge 13, is supplied to a control unit 21. This control unit 21 controls each of the heating temperature (drawing temperature) of the optical fiber preform 1 by the heating furnace 11, the rotational speed of the capstan 16 (i.e., the drawing rate of the coated optical fiber 2), and the feed rate of the optical fiber preform 1 by the preform feeder 12. At this time, where the outside diameter of the optical fiber preform 1 is D and the set drawing speed of the coated optical fiber 2 v1, the control unit 21 controls the set feed rate Vf1 of the optical fiber preform 1 so as to satisfy Eq (1) below.

$$Vf1 = v1 \cdot d^2 / D^2 \qquad (1)$$

(First Embodiment)

Figure 2A:
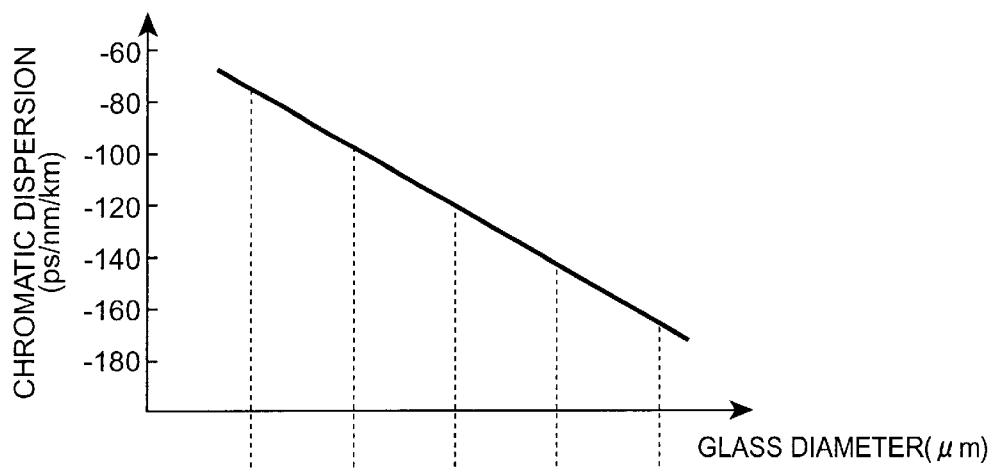
FIG. 2A is a graph showing a relationship between chromatic dispersion and glass diameter (outside diameter of optical fiber), and FIG. 2B a graph showing a relation between cutoff wavelength and glass diameter (outside diameter of optical fiber).
Figure 2B:
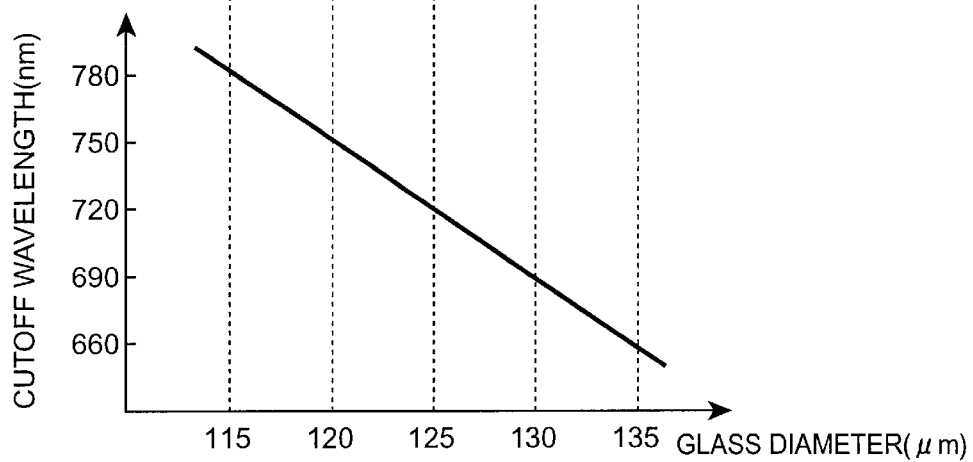

The first embodiment of the optical fiber fabrication method according to the present invention will be described below with reference to FIGS. 2A, 2B, and 3. FIG. 2A is a graph showing the relationship between chromatic dispersion and glass diameter (outside diameter of the bared optical fiber), and FIG. 2B a graph showing the relationship between cutoff wavelength and glass diameter (outside diameter of the bared optical fiber). As seen from these graphs, as the glass diameter varies, the cutoff wavelength also varies and the chromatic dispersion also varies. Namely, a difference between an actual cutoff wavelength measured and a target cutoff wavelength corresponds to a difference between actual chromatic dispersion and target chromatic dispersion. Therefore, the optical fiber fabrication method according to the first embodiment is arranged to adjust the glass diameter, based on the difference between the actual cutoff wavelength measured and the target cutoff wavelength, thereby correcting the actual chromatic dispersion to the target chromatic dispersion.

Figure 3:
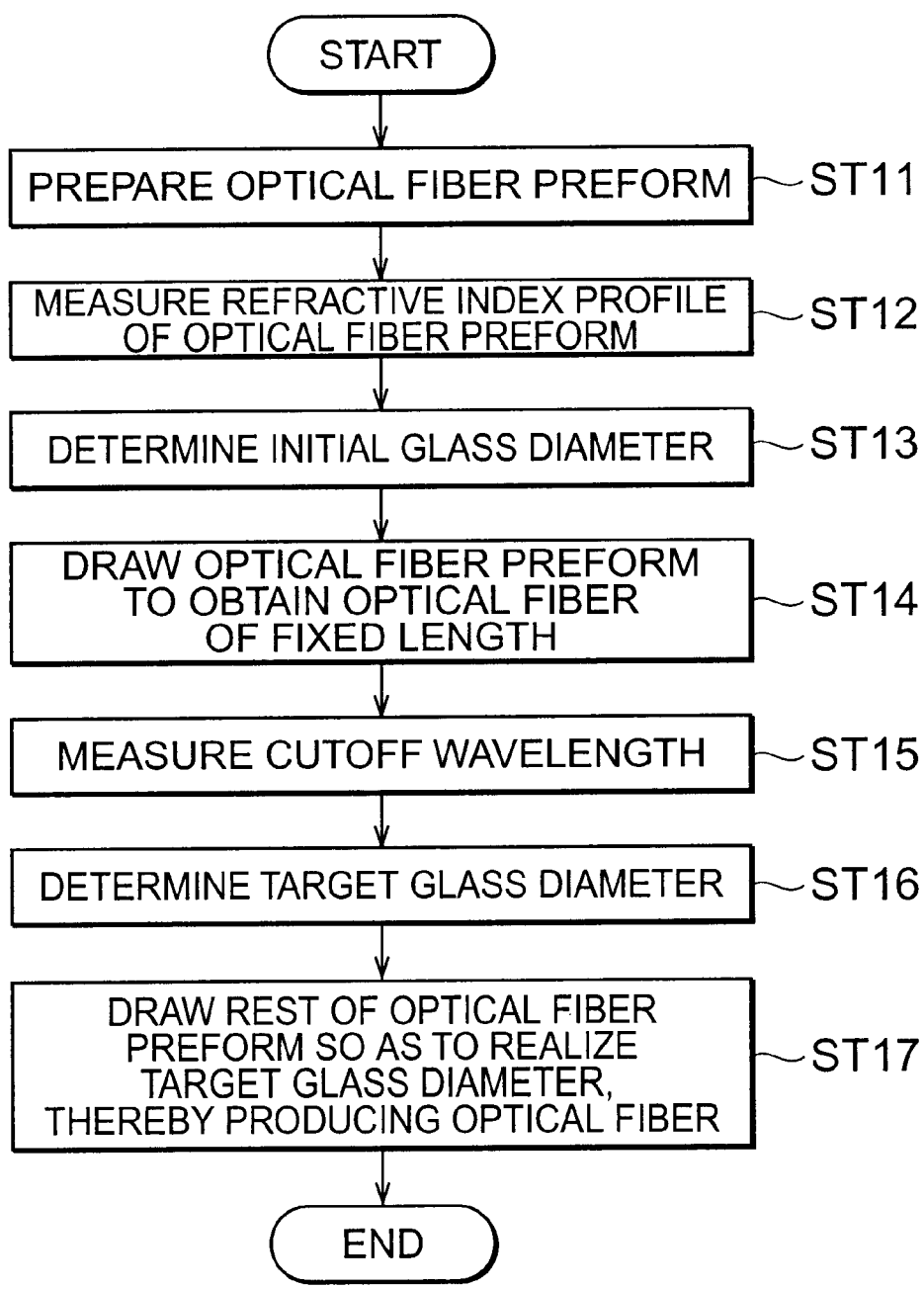
FIG. 3 is a flowchart for explaining the first embodiment of the optical fiber fabrication method according to the present invention.

FIG. 3 is a flowchart for explaining the optical fiber fabrication method according to the first embodiment. The optical fiber fabrication method according to the first embodiment is carried out by the drawing system and measuring system as shown in FIG. 1A and FIG. 1B.

In the first embodiment, the first step is to prepare the optical fiber preform 1 whose refractive index profile is uniform in the longitudinal direction (step ST11), and the refractive index profile of this optical fiber preform 1 is measured by the preform analyzer (step ST12). Based on the result of this measurement and designed values of the preform structure, a glass diameter of the bared optical fiber is determined for fabrication of the coated optical fiber 2 having objective chromatic dispersion at a predetermined wavelength (e.g., 1.55 µm). This glass diameter determined is used as an initial glass diameter (step ST13).

After that, the optical fiber preform 1 is fixed to the preform feeder 12 and then the optical fiber preform 1 is guided into the heating furnace 11 by the preform feeder 12. This results in heating and melting the lower end of the optical fiber preform 1. During drawing of the optical fiber preform 1 melted at the lower end, the control unit 21 controls the outside diameter so that the glass diameter of the resultant bared optical fiber becomes the initial glass diameter.

Figure 1B:
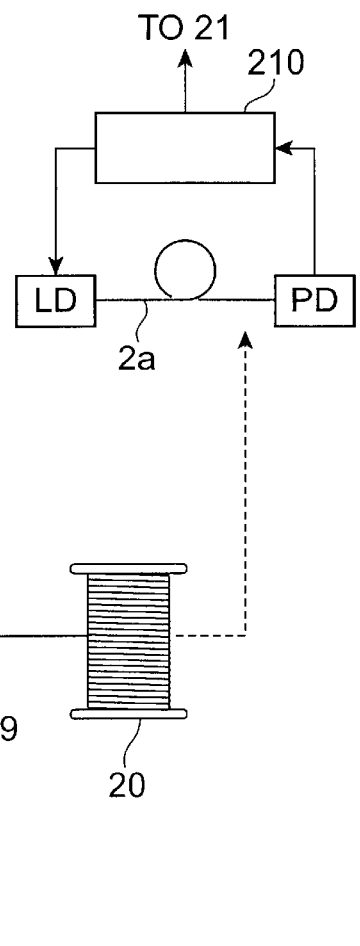

Here a portion (an optical fiber 2a of a fixed length to be measured) is cut out of the coated optical fiber 2 obtained after the start of drawing (step ST14), and the measuring system 210 shown in FIG. 1B measures the cutoff wavelength of this optical fiber 2a to be measured (step ST15). The optical fiber 2a to be measured has a length enough to measure the cutoff wavelength, which is specifically about 1 m to 10 m.

The control unit 21 compares this measured cutoff wavelength with the target cutoff wavelength and corrects the glass diameter of the bared optical fiber for production of the coated optical fiber 2 having the objective chromatic dispersion at the predetermined wavelength, based on the result of the comparison. This corrected glass diameter is used as a target glass diameter (step ST16). For example, where the initial glass diameter is $d_0$, the target cutoff wavelength $\lambda_{c1}$, and the measured cutoff wavelength $\lambda_{c0}$, the target glass diameter $d_1$ is given by Eq (2) below.

$$d_1 = d_0 \times \lambda_{c1} / \lambda_{c0} \qquad (2)$$

After that, the rest of the optical fiber preform 1 is drawn so that the glass diameter of the resultant bared optical fiber becomes the target glass diameter, thereby fabricating the optical fiber with the desired optical characteristic (coated optical fiber 2) (step ST17).

If at step ST15 the difference between the measured cutoff wavelength and the target cutoff wavelength is within a fixed range, the difference between the actual chromatic dispersion and the target chromatic dispersion is also within tolerance, and thus the initial glass diameter may also be employed as the target glass diameter as it is. For example, when the measured cutoff wavelength $\lambda_{c0}$ satisfies the following condition (3) relative to the target cutoff wavelength $\lambda_{c1}$, the initial glass diameter $d_0$ is employed as the target glass diameter $d_1$ as it is.

$$\lambda_{c1}-10 \text{ nm} \leq \lambda_{c0} \leq \lambda_{c1}+10 \text{ nm} \tag{3}$$

On the other hand, when the measured cutoff wavelength $\lambda_{c0}$ does not satisfy the above condition (3), the target glass diameter $d_1$ is determined by foregoing Eq (2). The method may also be arranged in such a manner that steps ST14 to ST16 are repeatedly carried out while the glass diameter is renewed until the difference between the cutoff wavelength measured at step ST15 and the target cutoff wavelength falls within the fixed range. This permits the target glass diameter to be set closer to the glass diameter of the fiber with the target cutoff wavelength more accurately.

For controlling the glass diameter to the target glass diameter (or the initial glass diameter) while maintaining the set drawing speed of the coated optical fiber 2 at v1, the set feed speed Vf1 of the optical fiber preform 1 is determined based on above Eq (1), on-line measurement is carried out to measure the glass diameter d of the coated optical fiber 2 by the outside diameter gauge 13, and the rotational speed of the capstan 16 is controlled based on this glass diameter d, which makes it feasible to maintain the glass diameter d of the bared optical fiber constant. These controls are carried out by the control unit 21.

In the first embodiment, as described above, the cutoff wavelength is measured in the optical fiber with the fixed length obtained after the drawing start (the optical fiber 2a to be measured), the corrected target glass diameter is determined based on the measurement result, and the rest of the optical fiber preform 1 is drawn to fabricate the coated optical fiber 2 while the outside diameter is controlled so that the glass diameter becomes the target glass diameter. This permits the optical fiber with the objective chromatic dispersion characteristic to be obtained readily even if the processing accuracy of the optical fiber preform prepared is poor or even if the measurement accuracy of refractive index profile of the optical fiber preform by the preform analyzer is poor. In particular, the optical fiber fabrication method is suitable for the fabrication of dispersion compensating optical fibers whose chromatic dispersion characteristic sensitively varies according to variation of glass diameter.

(Second Embodiment)

Figure 4A:
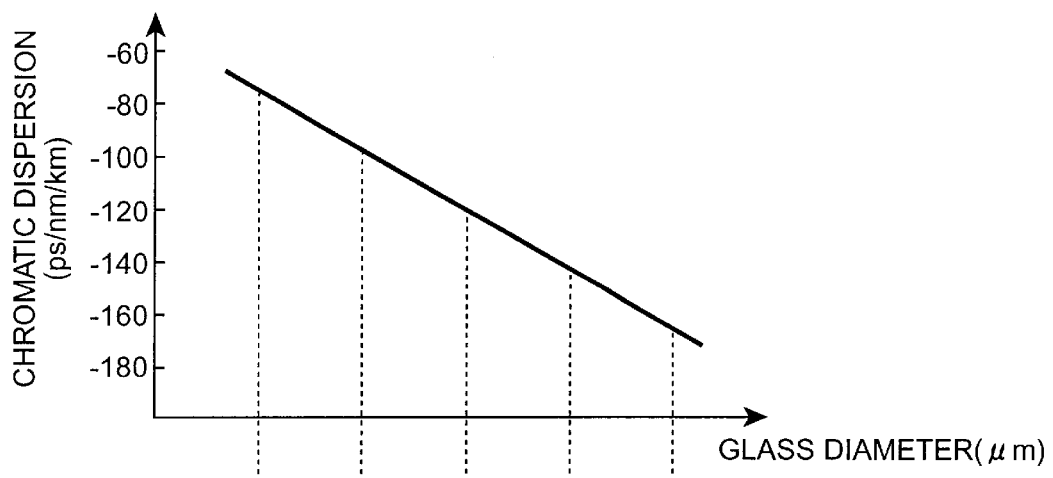
FIG. 4A is a graph showing a relationship between chromatic dispersion and glass diameter (outside diameter, of optical fiber), and FIG. 4B a graph showing a relation between mode field diameter and glass diameter (outside diameter of optical fiber).
Figure 4B:
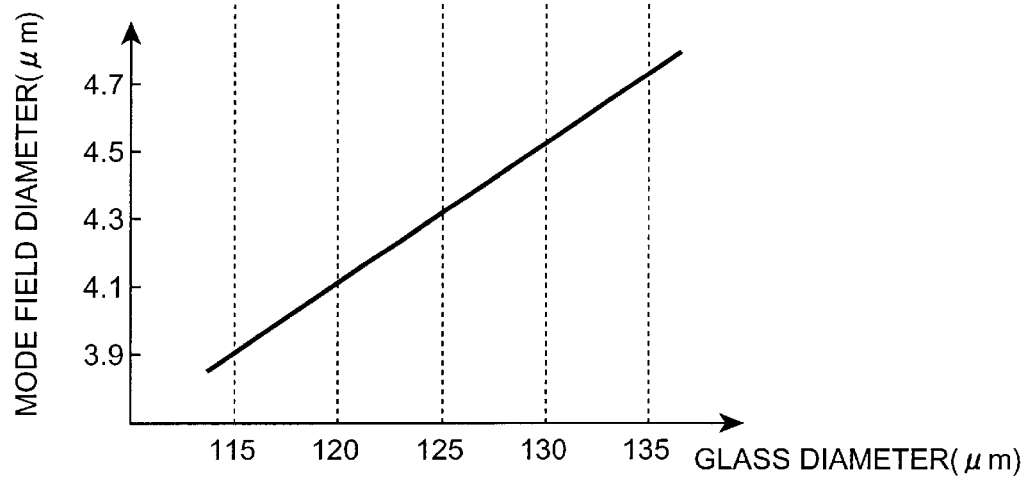

The second embodiment of the optical fiber fabrication method according to the present invention will be described below with reference to FIGS. 4A, 4B, and 5. FIG. 4A is a graph showing the relationship between chromatic dispersion and glass diameter (outside diameter of the bared optical fiber), and FIG. 4B a graph showing the relationship between mode field diameter and glass diameter (outside diameter of the bared optical fiber). As seen from these graphs, as the glass diameter varies, the mode field diameter also varies and the chromatic dispersion also varies. Namely, a difference between an actual mode field diameter measured and a target mode field diameter corresponds to a difference between actual chromatic dispersion and target chromatic dispersion. Therefore, the second embodiment is arranged to adjust the glass diameter, based on the difference between the actual mode field diameter measured and the target mode field diameter, thereby correcting the actual chromatic dispersion to the target chromatic dispersion.

Figure 5:
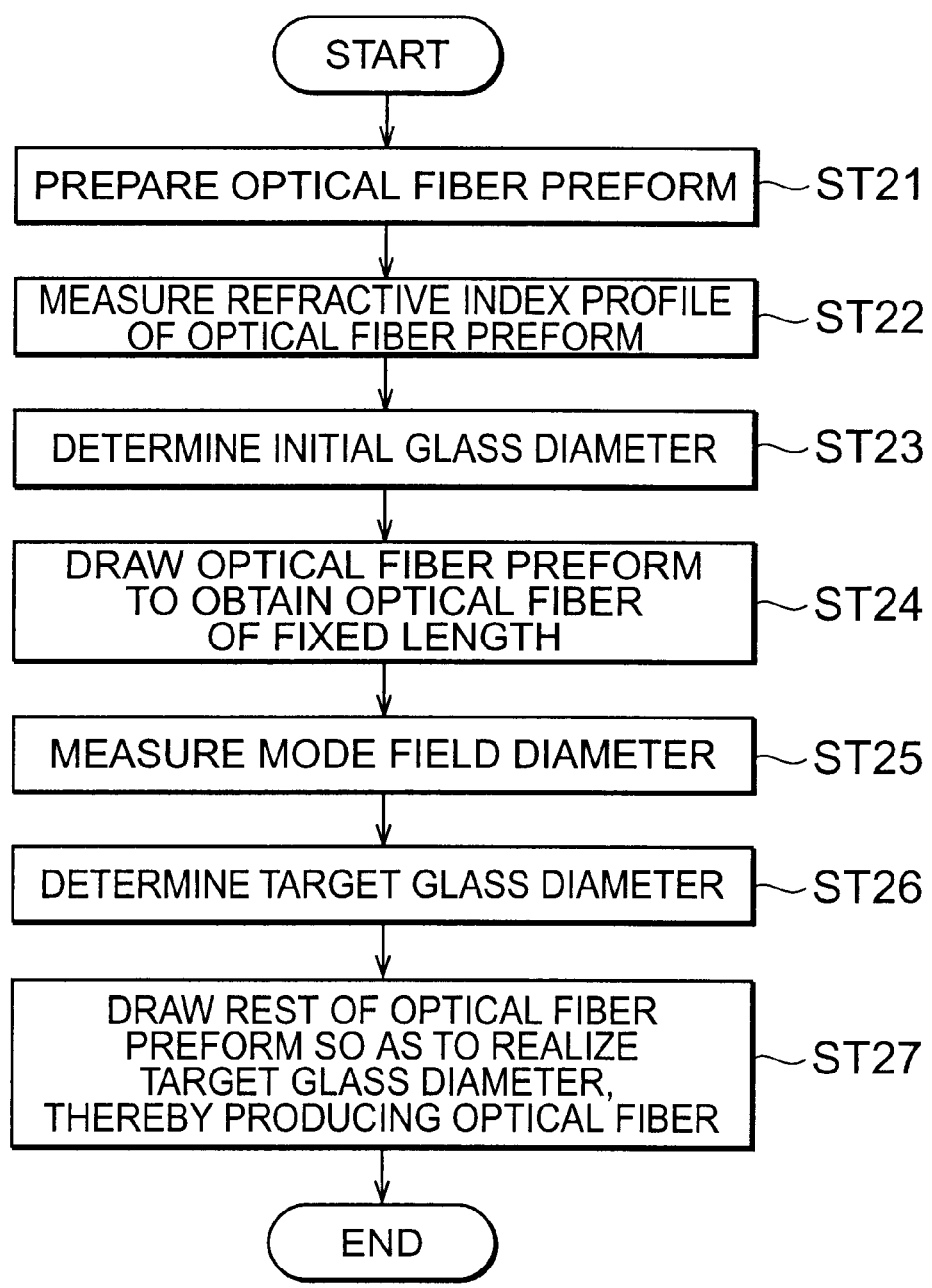
FIG. 5 is a flowchart for explaining the second embodiment of the optical fiber fabrication method according to the present invention.

FIG. 5 is a flowchart for explaining the optical fiber fabrication method according to the second embodiment. The optical fiber fabrication method according to the second embodiment is also carried out by the drawing system and measuring system as shown in FIG. 1A and FIG. 1B, as in the first embodiment.

In the second embodiment, the first step is to prepare the optical fiber preform 1 whose refractive index profile is uniform in the longitudinal direction (step ST21), and the refractive index profile of this optical fiber preform 1 is measured by the preform analyzer (step ST22). Based on the result of this measurement and designed values of the preform structure, a glass diameter of the bared optical fiber is determined for fabrication of the coated optical fiber 2 having objective chromatic dispersion at a predetermined wavelength (e.g., 1.55 $\mu$m). This glass diameter determined is used as an initial glass diameter (step ST23).

After that, the optical fiber preform 1 is fixed to the preform feeder 12 and then the optical fiber preform 1 is guided into the heating furnace 11 by the preform feeder 12. This results in heating and melting the lower end of the optical fiber preform 1. During drawing of the optical fiber preform 1 melted at the lower end, the control unit 21 controls the outside diameter so that the glass diameter of the resultant bared optical fiber becomes the initial glass diameter.

Here a portion (the optical fiber 2a to be measured) is cut out of the coated optical fiber 2 obtained after the start of drawing (step ST24), and the measuring system 210 shown in FIG. 1B measures the mode field diameter of this optical fiber 2a to be measured (step ST25). The optical fiber 2a to be measured has a length enough to measure the mode field diameter, which is specifically about 1 m to 10 m.

The control unit 21 compares this measured mode field diameter with the target mode field diameter and corrects the glass diameter of the bared optical fiber for fabrication of the coated optical fiber 2 having the objective chromatic dispersion at the predetermined wavelength, based on the result of the comparison. This corrected glass diameter is used as a target glass diameter (step ST26). For example, where the initial glass diameter is $d_0$, the target mode field diameter $M_1$, and the measured mode field diameter $M_0$, the target glass diameter $d_1$ is given by Eq (4) below.

$$d_1 = d_0 \times M_1 / M_0 \tag{4}$$

After that, the rest of the optical fiber preform 1 is drawn so that the glass diameter of the resultant bared optical fiber becomes the target glass diameter, thereby fabricating the coated optical fiber 2 with the desired optical characteristic (step ST27).

If the difference between the mode field diameter measured at step ST25 and the target mode field diameter is within a fixed range, the difference between the actual chromatic dispersion and the target chromatic dispersion is also within tolerance, and thus the initial glass diameter may also be employed as the target glass diameter as it is. For example, when the measured mode field diameter $M_0$ satisfies the following condition (5) relative to the target mode field diameter $M_1$, the initial glass diameter $d_0$ is employed as the target glass diameter $d_1$ as it is.

$$M_1 - 0.2 \ \mu m \leq M_0 \leq M_1 + 0.2 \ \mu m \tag{5}$$

On the other hand, when the measured mode field diameter $M_0$ does not satisfy the above condition (5), the target glass diameter $d_1$ is determined by foregoing Eq (4) The method may also be arranged in such a manner that steps ST24 to ST26 are repeatedly carried out while the glass diameter is renewed until the difference between the mode field diameter measured at step ST25 and the target mode field diameter falls within the fixed range. This permits the target glass diameter to be set closer to the glass diameter of the fiber with the target mode field diameter more accurately.

For controlling the glass diameter to the target glass diameter (or the initial glass diameter) while maintaining the set drawing speed of the coated optical fiber 2 at v1, the set feed speed Vf1 of the optical fiber preform 1 is determined based on above Eq (1), on-line measurement is carried out to measure the glass diameter d of the optical fiber 2 by the outside diameter gauge 13, and the rotational speed of the capstan 16 is controlled based on this glass diameter d, which makes it feasible to maintain the glass diameter d of the bared optical fiber constant. These controls are carried out by the control unit 21.

In the second embodiment, as described above, the mode field diameter is measured in the optical fiber with the fixed length obtained after the drawing start (the optical fiber 2a to be measured), the corrected target glass diameter is determined based on the measurement result, and the rest of the optical fiber preform 1 is drawn to fabricate the coated optical fiber 2 while the outside diameter is controlled so that the glass diameter becomes the target glass diameter. This permits the optical fiber with the objective chromatic dispersion characteristic to be obtained readily even if the processing accuracy of the optical fiber preform prepared is poor or even if the measurement accuracy of refractive index profile of the optical fiber preform by the preform analyzer is poor. In particular, the optical fiber fabrication method is suitable for the fabrication of dispersion compensating optical fibers whose chromatic dispersion characteristic sensitively varies according to variation of glass diameter.

From the above description of the present invention, it is apparent that the present invention involves various modifications. Such modifications are considered to be realized without departing from the spirit and the scope of the present invention and all improvements obvious to those skilled in the art are intended to be included in the scope of the claims which will follow.

Industrial Applicability

In accordance with the present invention, as described above, either of the cutoff wavelength and the mode field diameter is measured in the optical fiber with the fixed length obtained after the start of drawing of the optical fiber preform, the target glass diameter for yielding the objective chromatic dispersion characteristic is determined based on the cutoff wavelength or the mode field diameter measured, and the rest of the optical fiber preform is drawn while the outside diameter is controlled to the target glass diameter thus determined. Accordingly, the optical fiber having the objective chromatic dispersion characteristic is obtained readily even if the processing accuracy of the optical fiber preform is poor or even if the measurement accuracy of refractive index profile of the optical fiber preform by the preform analyzer is poor. In particular, the present invention is suitably applicable to the fabrication of dispersion compensating optical fibers which sensitively vary the chromatic dispersion characteristic according to variation of the glass diameter (outside diameter of optical fiber).

What is claimed is:

1. An optical fiber fabrication method of fabricating an optical fiber with a desired optical characteristic by drawing an optical fiber preform to produce an optical fiber, comprising the steps of:

measuring a cutoff wavelength in an optical fiber with a fixed length which is obtained by drawing a part of said optical fiber preform;

determining a target glass diameter for yielding an objective chromatic dispersion characteristic, based on said cutoff wavelength measured; and drawing the rest of said optical fiber preform while controlling an outside diameter to said target glass diameter determined.

2. An optical fiber fabrication method of fabricating an optical fiber with a desired optical characteristic by drawing an optical fiber preform, comprising the steps of:

measuring a mode field diameter in an optical fiber with a fixed length which is obtained by drawing a portion of said optical fiber preform;

determining a target glass diameter for yielding an objective chromatic dispersion characteristic, based on said mode field diameter measured; and drawing the rest of said optical fiber preform while controlling an outside diameter to said target glass diameter determined.

* * * * *